B. W. MENDENHALL.
INCUBATOR.
APPLICATION FILED OCT. 21, 1914.
1,214,053.
Patented Jan. 30, 1917.
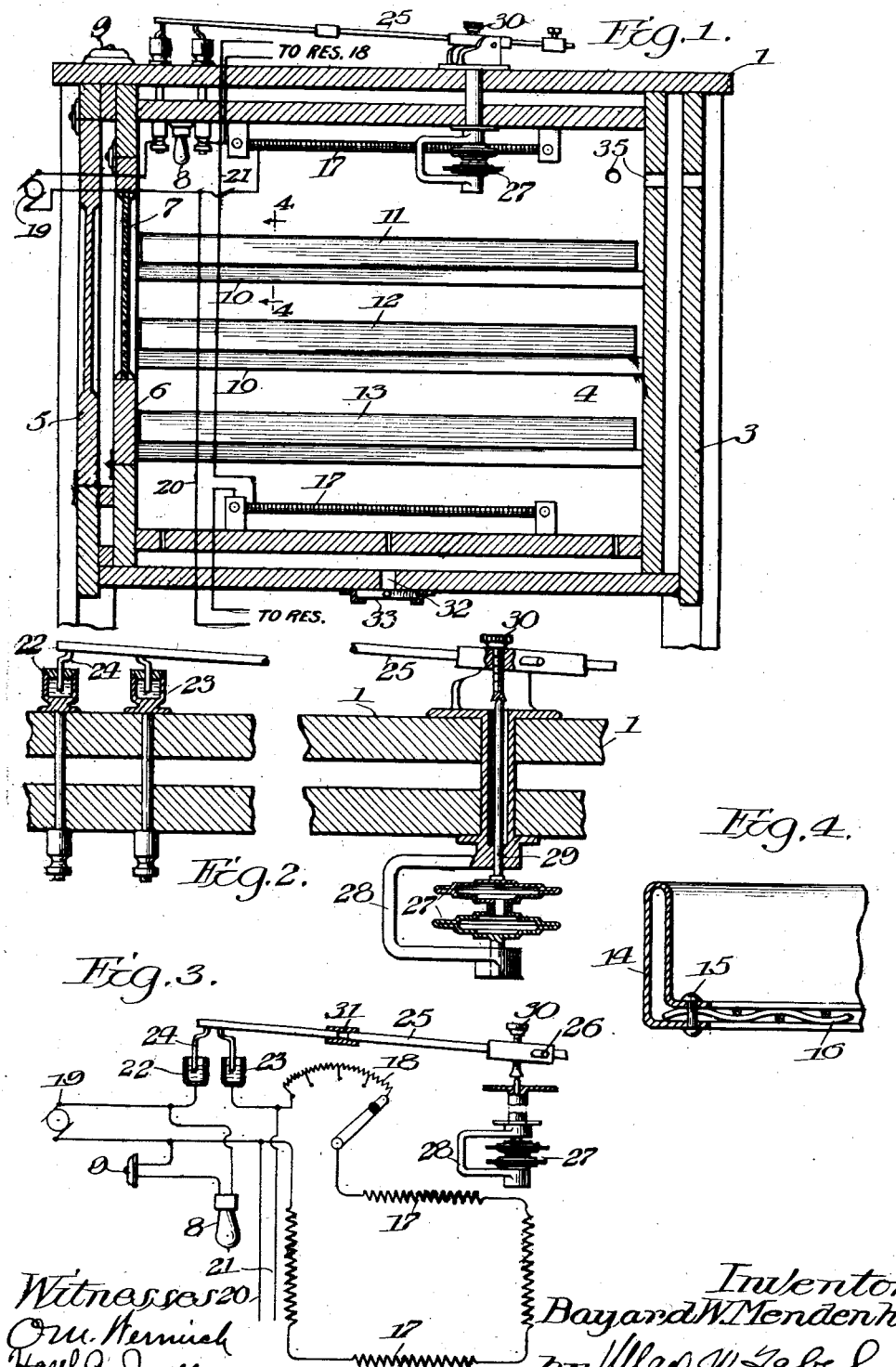
Witnesses
O. M. Wernich
Hazel Q. Jones.
Inventor
Bayard W. Mendenhall
by Max W. Zabel
atty

UNITED STATES PATENT OFFICE.

BAYARD W. MENDENHALL, OF SALT LAKE CITY, UTAH.

INCUBATOR.

1,214,053.   Specification of Letters Patent.   Patented Jan. 30, 1917.

Application filed October 21, 1914. Serial No. 867,813.

*To all whom it may concern:*

Be it known that I, BAYARD W. MENDENHALL, a citizen of the United States, residing at Salt Lake City, in the county of Salt Lake and State of Utah, have invented a certain new and useful Improvement in Incubators, of which the following is a full, clear, concise, and exact description, reference being had to the accompanying drawings, forming a part of this specification.

My invention relates to incubators and has for its object the provision of an incubator structure and arrangement in which a plurality of trays may be used and in which the heating devices are of such a character that a uniform temperature may be maintained even with the multitude of superposed trays.

The essential element to be considered in the incubation of eggs is to maintain each egg at a uniform temperature at or about 103° F. Incubators have hitherto been arranged to accommodate but one tray in that they were not adapted to supply a uniform temperature throughout a series of superposed trays. Heretofore it has been impossible to build machines in this manner owing to the fact that the heating element, hot air or hot water, or electric radiators, have been located above the egg trays. Owing to the natural tendency for heated air to rise to and remain in the top part of a closed compartment, when the temperature in the plane of the egg tray was at 103 degrees, it would be three or four degrees cooler than that—entirely too low for the incubation of the germ within the egg—three or four inches below the tray.

My invention consists in the use of two heating units, one in the top of the machine and one in the bottom, and the use of two egg trays, one above the other, in addition to the regular chick tray. I discovered, after much experimenting, that by properly proportioning the amount of heat radiated by each unit an even temperature is maintained in the plane of each tray throughout their entire surface.

The incubation of the germ in an egg will proceed most successfully when its entire contents is maintained at a uniform temperature at or about 103 degrees, assuming that the proper conditions of moisture and ventilation prevail.

I will explain one form which my invention may take more in detail by referring to the accompanying drawing illustrating one embodiment thereof in which—

Figure 1 is a vertical sectional view of the incubator constructed in accordance with my invention; Fig. 2 is an enlarged sectional view of the temperature controlling mechanism; Fig. 3 is a diagrammatic view of the circuit arrangements, and Fig. 4 is a sectional view of an egg tray on line 4—4 of Fig. 1.

My improved incubator consists of a double walled structure as seen more clearly from Figs. 1 and 2, having the top 1, bottom 2, end wall 3, and side walls 4, together with two doors respectively the doors 5 and 6 to permit access to the interior thereof. The door 6 is provided with a glass panel 7 so that when the door 5 is open the interior may be exposed to view. A lamp 8 is provided the circuit through which is suitably controlled by a push button 9 so that this lamp is not illuminated unless the push button is actuated.

Within the interior of the incubator I provide supports such as the supports 10 upon which egg trays 11 and 12 and a chick tray 13 may be placed in such a manner so that they can be readily slid into and out of the structure as may be desired. These trays are preferably constructed on the lines shown in detail in Fig. 4 in which these egg trays have a rim 14 held together by rivets 15, which rivets at the same time support a wire screen 16 as will be clear from the illustration. It will be noted that three trays are superposed one above the other.

The problem which I have solved is to maintain an equal and uniform temperature throughout the series of trays and this I accomplish through the agency of heating units placed above and below. In the particular form shown these heating units are electrical in their nature and comprise resistance coils 17, 17. In the particular model which is the subject matter of the illustration there are four of these heating units arranged preferably in the form of a rectangle at the top of the incubator and a corresponding set of four of these heating units at the bottom portion of the incubator, being arranged as shown more clearly in Fig. 3. These heating units may be of any well known form of electrical heating units. My invention contemplates the provision of means such for instance as the resistance 18 interposed in at least one set of these units so that the relative amount of heat given out by the two can be readily adjusted so as to obtain the uniform temperature desired. These heating units are suitably arranged preferably in series with a source of current 19 and in series with the resistance 18. In the diagrammatic illustration of Fig. 3 the upper row of resistance units is shown and conductors 20 and 21 are illustrated as leading to the lower four resistance units 17. Now in order to control the circuit closure through these resistance units and the source of current in accordance with the temperature within the incubator, I provide a pair of mercury cups 22 and 23 adapted to coöperate with a circuit controlling element 24 insulatingly mounted on a lever 25. This lever 25 swings around a pivot 26 and thus has its left hand extremity elevated or lowered so that the circuit controlling element 24 either closes circuit through the mercury cups 22 or 23, or is elevated a sufficient distance above so that the circuit through the cups is not completed. The control of this lever 25 is effected by hollow drums 27 preferably filled with ether mounted as shown more clearly in Fig. 2 where the lower portion of the lower drum is held in an arm 28. The upper portion of the upper drum is fastened to a slidable spindle 29 which controls the upward or downward movement of the lever 25. An adjusting screw 30 standardizes the equipment as may be needed. The ether within the drums 27 contracts or expands in accordance with the temperature within the incubator and thus controls the inclusion or exclusion of the heating elements with the source of supply 19. An insulating break 31 is provided in the lever 25 so that the contact finger 21 is insulated from the metallic mounting portion of the lever.

The outer bottom wall is provided with a ventilating opening 32 controlled by a slide 33 so that its degree of opening and closing may be controlled. A plurality of small holes 34 are provided in the inner bottom for purposes of ventilation and exit openings 35 are provided to permit the air to escape at the top of the device. The holes 34 are smaller than the opening 32 and are spaced throughout the bottom so as to get a more uniform distribution of the air.

From what has been described the nature of my invention will be readily clear to those skilled in the art, and

Having thus described one form which my invention may take, what I claim as new and desire to secure by Letters Patent is:

1. An incubator consisting of a heating chamber, a plurality of removable egg or chick trays, adapted to be closely packed respectively with eggs or chicks, and adapted to be subject to the thermal influence of said chamber, means within said chamber for supporting said trays one above the other, electric means for supplying heat only at the top wall and bottom wall of said chamber, each of said means being substantially a continuous unit around the vertical center line of said chamber and located between said center line and the outer walls of said chamber, a thermostat to control the heating of said means, and switching mechanism to control the relative heating effect of said two means.

2. An incubator consisting of a heating chamber, a plurality of removable egg or chick trays, adapted to be closely packed respectively with eggs or chicks, and adapted to be subject to the thermal influence of said chamber, means within said chamber for supporting said trays one above the other, electric means for supplying heat only at the top wall and bottom wall of said chamber, each of said means being substantially a continuous unit around the vertical center line of said chamber and located between said center line and the outer walls of said chamber, a thermostat to control the heating of said means, and switching mechanism to control the relative heating effect of said two means, the bottom wall of said chamber having a plurality of small holes through which a plurality of fine streams of air may pass for circulatory purposes.

3. An incubator consisting of a heating chamber, a plurality of removable egg or chick trays, adapted to be closely packed respectively with eggs or chicks, and adapted to be subject to the thermal influence of said chamber, means within said chamber for supporting said trays one above the other, electric means for supplying heat only at the top wall and bottom wall of said chamber, each of said means being substantially a continuous unit around the vertical center line of said chamber and located between said center line and the outer walls of said chamber, a thermostat to control the heating of said means, switching mechanism to control the relative heating effect of said two means, the bottom wall of said chamber having a plurality of small holes through which a plurality of fine streams of air may pass for circulatory purposes, a second wall outside of said bottom wall, said two walls forming an air chamber, and means to control the flow of air to said air chamber.

4. An incubator consisting of a heating chamber, a plurality of removable egg or chick trays, adapted to be closely packed respectively with eggs or chicks, and adapted to be subject to the thermal influence of said chamber, means within said chamber for supporting said trays one above the other, electric means for supplying heat at the top wall and bottom wall of said chamber, each of said means being substantially a continuous unit around the vertical center line of said chamber and located between said center line and the outer walls of said chamber, a thermostat to control the heating of said means, and switching mechanism to control the relative heating effect of said two means, the bottom wall of said chamber having a plurality of small holes through which a plurality of fine streams of air may pass for circulatory purposes.

5. An incubator consisting of a heating chamber, a plurality of removable egg or chick trays, adapted to be closely packed respectively with eggs or chicks, and adapted to be subject to the thermal influence of said chamber, means within said chamber for supporting said trays one above the other, electric means for supplying heat at the top wall and bottom wall of said chamber, each of said means being substantially a continuous unit around the vertical center line of said chamber and located between said center line and the outer walls of said chamber, a thermostat to control the heating of said means, switching mechanism to control the relative heating effect of said two means, the bottom wall of said chamber having a plurality of small holes through which a plurality of fine streams of air may pass for circulatory purposes, a second wall outside of said bottom wall, said two walls forming an air chamber, and means to control the flow of air to said air chamber.

In witness whereof, I hereunto subscribe my name this tenth day of October A. D., 1914.

BAYARD W. MENDENHALL.

Witnesses:
A. BLAIR RICHARDSON,
HAROLD A. JOHNSON.